Figure 1:
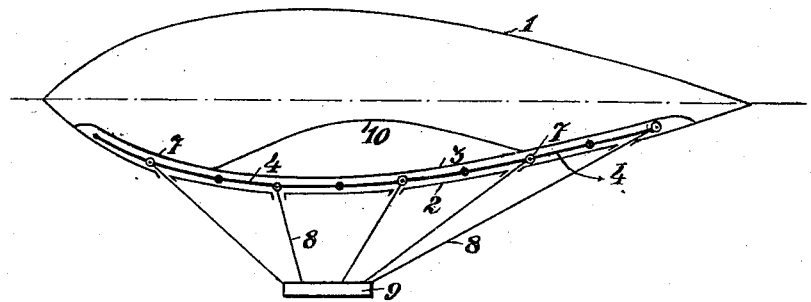

G. A. CROCCO & O. RICALDONI.
CAR SUSPENSION FOR AIRSHIPS.
APPLICATION FILED MAR. 27, 1909.

975,330.

Patented Nov. 8, 1910.

WITNESSES:
W. M. Avery
J. P. Davis

INVENTORS
Gaetano Arturo Crocco
Ottavio Ricaldoni
BY
ATTORNEYS

UNITED STATES PATENT OFFICE.

GAETANO ARTURO CROCCO AND OTTAVIO RICALDONI, OF ROME, ITALY.

CAR SUSPENSION FOR AIRSHIPS.

975,330.  Specification of Letters Patent.  Patented Nov. 8, 1910.

Application filed March 27, 1909. Serial No. 486,124.

*To all whom it may concern:*

Be it known that we, GAETANO ARTURO CROCCO and OTTAVIO RICALDONI, both subjects of the King of Italy, and captains in the Aeronautical Brigade, residing in Rome, in the Kingdom of Italy, have invented certain new and useful Improvements in a Car Suspension for Airships, of which the following is a specification.

Our invention relates to improvements in the means for suspending the car of dirigible airships, and connecting the same with the gas bag, and comprises a novel arrangement of parts applicable in all cases, but particularly advantageous when a short car has to be suspended by a much longer balloon hull. It is well known that when the car has the same length, or approximatively the same length of the balloon, the "flexible" type of suspension can be adopted, that is the car can be directly connected to the gas bag by means of wires or ropes conveniently disposed, in order to insure as much as possible a perfect indeformability. When the car is too short the above system is not practically convenient and it becomes necessary to insert between the gas bag and the car a long horizontal beam having sufficient stiffness, which beam is suspended under the gas bag, in the same way as a long car, and supports in its turn the short car. It is evident that the presence of the intermediate beam greatly increases the resistance of the air and diminishes the speed of the airships. It has been, therefore, proposed to have the rigid structure transferred in immediate contact with the gas bag and directly fixed to same. The disadvantage of this arrangement is that on one side the envelop cannot change its form in accordance with the variations of the gas pressure, because the part fixed to the rigid structure does not follow the fluctuation of the gas, and on the other side dangerous stresses arise where the metallic armature is fixed to the tissue, so that the latter becomes liable to soon be torn.

According to the present invention all the above-mentioned inconveniences are avoided by arranging a flat supporting beam in the interior of the balloon resting freely on the bottom of same, so that the tissue of the envelop is not prevented from extending or contracting under the influence of the strains to which it is subjected. The car is suspended to said beam by means of cords passing through holes provided in the lower portion of the envelop whereon rests the beam. Said portion of the envelop must be strong enough to withstand the strains arising from the buoyancy, and a second layer of lighter gas tight fabric is arranged above the beam and completes the gas tight closing of the envelop at its lower part. The girder may consist in a lattice work or grating arranged inside the lowermost part of the envelop of the aerostat, its meshes being formed by elements arranged preferably in such a manner as to follow the meridians and the parallels. A girder or beam of this kind presents the same disadvantages as the continuous beams resting on several supports, viz: even a slight vertical yielding of the supports can produce considerable bending strains in the beam. In this particular kind of girder the said disadvantage is a very great one, because the supports are formed by the suspension cords of the car, which cords through the vibrations of the propelling device as well as through variations of the temperature and through irregularities in putting together the several parts, can easily undergo variations in tension, thus producing variations in the forces acting on the knots, which should, on the contrary, maintain constant determined values, in order that the perfect equilibrium of the system is obtained in the manner calculated. In order to avoid this disadvantage, under the invention, we subdivide the longitudinal elements following the meridians into as many independent sections as there are spans of the beam, connecting them with each other by means of hinges. By adopting this arrangement it will be convenient to substitute for the transversal elements having the form of arcs of circles other rectilinear elements, so as to obtain a greater stability. Each span of the beam would then be formed by a flat latticework having square meshes, and in order to avoid deformations of any kind, it will be convenient to provide each mesh of same with rigid or wire-rope diagonals.

Thus the bottom of the balloon will externally appear as formed by a plurality of cylindrical elements with horizontal generatrices perpendicular to the longitudinal axis of the air ship and intersecting along the rectilinear transversal elements of the lattice work contained therein.

In order to cause the lower fabric of the envelop to adhere perfectly to the beam which rests upon same, it will be necessary at the lower part of the envelop, abandoning the ordinary shape of revolution, to adopt as the keel the developable surface which has as directrixes the two meridians, or other suitable curves, which form the periphery of the beam, and as generatrixes rectilinear elements, normal to the longitudinal axis of the airship, resting on said directrixes.

Figure 2:
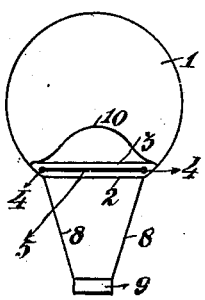
Figure 3:
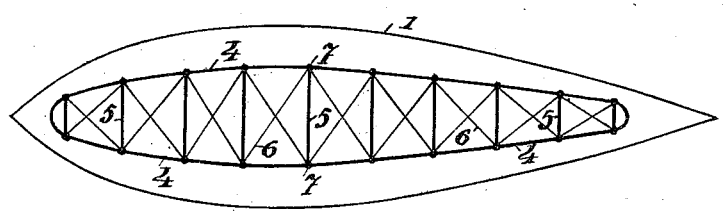

In the annexed drawing, which shows diagrammatically the arrangement of the improved beam: Figures 1, 2 and 3 show in longitudinal section, transverse section, and horizontal section, respectively, a dirigible aerostat ship provided with a girder according to the present invention.

On the bottom of the envelop —1— is placed the latticework beam embraced between the outer fabric —2—, which serves to support the same, and an inner fabric —3— which closes the gas-bag, inside which the "ballonet" —10— is placed. In the example shown in the drawing the beam is formed by longitudinal elements —4— following the meridians and by rectilinear transverse elements —5—. Thus square meshes are formed, each one of which constitutes a span of the beam stiffened by means of the diagonal —6—, which can consist of wire-rope, for, as the meshes in this construction are flat, the employment of rectilinear diagonals does not cause any difficulty.

Each span of the beam is hinged to that next adjacent thereto in the joints —7—, where the longitudinal elements meet the transverse elements and where the cords —8— serving for suspending the car —9— are preferably attached and which run through orifices formed in the outer fabric —2— of the envelop. As the flat keel of the envelop constructed in the above manner is perfectly developable on one plane, it greatly facilitates the filling and emptying of the envelop, because the beam from the beginning of the operation can be placed on the ground together with the envelop in the same way as a chain; the envelop takes then its shape under the action of the inner pressure of the gas and of the tensions which are developed in the cords.

In order to obtain the constancy in the shape, when the airship is in action, it is necessary to employ as usual an inner ballonet —10— with compressed air. In the present case, however, the importance of this piece is greatly reduced; the pressure of the air in its inside can in fact be greatly diminished and the pressure which can be obtained by the speed of travel may be sufficient if the air is gathered with a suitable wind sleeve conveniently disposed, as is at present practiced with some types of captive balloons. Lastly with the aforesaid linked girder the airship can remain in the shed without any internal pressure, because a girder of this kind easily accommodates itself to the variations in the shape of the gas bag caused by the variations of the gas pressure, while such accommodation is not possible in the case of rigid and non deformable girders without producing dangerous stresses in their elements.

Having now particularly described and ascertained the nature of our said invention and in what manner the same is to be performed, we declare that what we claim is:

1. In a dirigible airship, the combination with the envelop, of a lattice work beam lying along the bottom of the envelop, said beam comprising a plurality of independent sections hinged together, the sections being substantially rectangular in form.

2. In a dirigible airship, the combination with the envelop, of a lattice work beam lying along the bottom of said envelop, said beam comprising a plurality of independent sections hinged together, the sections being substantially rectangular in form, and each being provided with diagonal braces.

3. In a dirigible airship, the combination with the envelop of the gas bag composed at the bottom of inner and outer layers, of a lattice work beam between the layers, and composed of a plurality of independent sections placed in longitudinal alinement, said sections being hinged to each other at their ends, a car below the envelop, and flexible supports extending from each end of the alternate hinge connections to the car.

4. In a dirigible airship, the combination with the envelop of the gas bag composed at the bottom of inner and outer layers, of a lattice work beam between the layers, and composed of a plurality of independent sections placed in longitudinal alinement, said sections being hinged to each other at their ends.

5. The combination with the envelop of a dirigible airship, of a lattice work beam in the lower side of the envelop, said beam being divided transversely at regular intervals, into a plurality of sections, said sections being hinged at their abutting ends.

6. The combination with the envelop of a dirigible airship, of a longitudinally flexible lattice work beam in the lower side of the envelop.

In witness whereof we have set hereunto our hands in the presence of two subscribing witnesses.

GAETANO ARTURO CROCCO.
OTTAVIO RICALDONI.

Witnesses:
LETTERIO LATRUETTO,
RENATO SCEVOLO.